United States Patent
Yang et al.

(10) Patent No.: US 10,645,285 B2
(45) Date of Patent: May 5, 2020

(54) ELECTRONIC DEVICE HAVING PANORAMIC CAMERA

(71) Applicant: Acer Incorporated, New Taipei (TW)

(72) Inventors: Yi-Hsuan Yang, New Taipei (TW);
Cheng-Mao Chang, New Taipei (TW);
Pao-Min Huang, New Taipei (TW);
Yan-Fong Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/199,222

(22) Filed: Nov. 26, 2018

(65) Prior Publication Data

US 2019/0166310 A1 May 30, 2019

(30) Foreign Application Priority Data

Nov. 27, 2017 (TW) .............................. 106141230 A

(51) Int. Cl.
*H04N 5/225* (2006.01)
*H04N 5/232* (2006.01)
*H04N 7/18* (2006.01)

(52) U.S. Cl.
CPC ....... *H04N 5/23238* (2013.01); *H04N 5/2252* (2013.01); *H04N 5/2257* (2013.01); *H04N 7/183* (2013.01)

(58) Field of Classification Search
CPC ... H04N 5/23238; H04N 5/2252; H04N 7/183
USPC .............................. 348/207.1, 373; 396/429
See application file for complete search history.

(56) References Cited

U.S. PATENT DOCUMENTS

| | | | | |
|---|---|---|---|---|
| 5,801,919 A * | 9/1998 | Griencewic | ........... | G06F 1/1686 348/552 |
| 6,933,981 B1 * | 8/2005 | Kishida | .............. | H04N 1/00249 348/207.1 |
| 7,061,536 B2 * | 6/2006 | Cha | ........................ | G06F 1/1616 348/376 |
| 7,126,816 B2 * | 10/2006 | Krah | ..................... | G06F 1/1616 361/679.55 |
| 8,134,638 B2 * | 3/2012 | Wang | .................... | G06F 1/1616 348/373 |
| 9,288,471 B1 * | 3/2016 | Yang | .................... | G01B 11/245 |
| 10,084,948 B2 * | 9/2018 | Yu | ........................ | H04N 5/2257 |
| 10,171,729 B2 * | 1/2019 | Qin | .................... | H04N 5/23216 |
| 2003/0234866 A1 * | 12/2003 | Cutler | ..................... | G06T 5/008 348/207.1 |

(Continued)

*Primary Examiner* — Usman A Khan
(74) *Attorney, Agent, or Firm* — JCIPRNET

(57) ABSTRACT

An electronic device including a display, a host, a hinge, a panoramic camera, a linkage assembly and a torsion spring is provided. The display has a plane facing the host. The hinge is connected between the display and the host. The panoramic camera is disposed in an accommodating space on an upper side of the display and is rotatable relative to the display. The linkage assembly is disposed in the display and driven by the hinge to limit the panoramic camera, such that the panoramic camera is kept in a state of being protruded from the plane of the display, and the torsion spring is disposed on a lower portion of the panoramic camera, wherein when the display is closed relative to the host, the hinge drives the linkage assembly to release the limitation on the panoramic camera, and the torsion spring enables the panoramic camera to be restored to the original position.

8 Claims, 4 Drawing Sheets

(56) References Cited

U.S. PATENT DOCUMENTS

| | | | | |
|---|---|---|---|---|
| 2005/0073155 A1* | 4/2005 | Weng | G06F 1/1616 | 292/138 |
| 2007/0279481 A1* | 12/2007 | Chambers | H04N 5/232 | 348/14.01 |
| 2008/0012944 A1* | 1/2008 | Lu | H04N 5/2252 | 348/207.1 |
| 2008/0123314 A1* | 5/2008 | Cheng | G06F 1/1616 | 361/809 |
| 2008/0198262 A1* | 8/2008 | Kuo | G06F 1/1616 | 348/373 |
| 2011/0013076 A1* | 1/2011 | Ko | G06F 1/1686 | 348/373 |
| 2016/0035233 A1* | 2/2016 | Breed | G09B 7/00 | 345/8 |

* cited by examiner

ELECTRONIC DEVICE HAVING PANORAMIC CAMERA

CROSS-REFERENCE TO RELATED APPLICATION

This application claims the priority benefit of Taiwan application serial no. 106141230, filed on Nov. 27, 2017. The entirety of the above-mentioned patent application is hereby incorporated by reference herein and made a part of this specification.

BACKGROUND OF THE INVENTION

Field of the Invention

The invention is related to an electronic device, and particularly to an electronic device capable of preventing black image from being generated.

Description of Related Art

Most of existing 360-degree panoramic camera devices use front/rear sided dual-lens module design to capture two fisheye photos from the front/rear side to be combined into a panoramic photo of 360-degree by software. Such dual-lens module is generally assembled along the same straight line to make optical axis to overlap, which causes that the assembly of the dual-lens module has a certain degree of thickness, and thus the 360-degree panoramic camera device has a greater thickness. When such panoramic camera is applied to a notebook computer, since the thickness of the panoramic camera cannot be effectively reduced, the panoramic camera is protruded from the plane of the display of the notebook computer, which affects the overall appearance of the notebook computer.

Therefore, there is a need to propose a new 360-degree panoramic camera module and a 360 degree panoramic camera device capable of effectively decreasing the height of the assembled dual-lens module to reduce the thickness of the 360-degree panoramic camera module and the 360-degree panoramic camera device.

SUMMARY OF THE INVENTION

The invention provides an electronic device capable of avoiding increase of the overall thickness while preventing black image from being generated.

In the invention, an electronic device includes a display and a host, a hinge, a panoramic camera, a linkage assembly, and a torsion spring. The display has a plane facing the host, and an upper side of the display is provided with an accommodating space. The hinge is connected between the display and the host, wherein the display can be opened or closed relative to the host by the hinge. The panoramic camera is disposed in the accommodating space on the upper side of the display, wherein the panoramic camera has a lower portion extending into the display while the lower portion being used as a rotating axis, the panoramic camera is adapted to be rotated relative to the display by the lower portion. The linkage assembly is adapted to limit the panoramic camera when the panoramic camera is rotated to a predetermined angle relative to the display, and the linkage assembly is driven by the hinge. The torsion spring is disposed on the lower portion of the panoramic camera extending into the display, the torsion spring is adapted to restore the panoramic camera to an original position after the linkage assembly releases the restriction on the panoramic camera.

In an embodiment of the invention, the linkage assembly includes a pull bar and a driving shaft. A longitudinal direction of the pull bar is parallel with an axial direction of the lower portion. The pull bar has a first end and a second end. The first end has a first limiting portion, and the second end is connected to the hinge. A longitudinal direction of the driving shaft is perpendicular to the axial direction of the lower portion used as a rotating axis. The driving shaft has a third end and a fourth end, wherein the third end has a second limiting portion, and the second limiting portion and the first limiting portion interfere with each other. The fourth end has a third limiting portion, wherein the lower portion of the panoramic camera has a hook, and the third limiting portion is adapted to limit the hook.

In an embodiment of the invention, the first limiting portion is one of a bump and a first guiding groove, and the second limiting portion is the other one of the bump and the first guiding groove.

In an embodiment of the invention, the first guiding groove has a first guiding portion and a second guiding portion, and an obtuse angle is formed between the first guiding portion and the second guiding portion.

In an embodiment of the invention, the display is provided with a first guiding rib, and the pull bar moves rectilinearly relative to the display in a track formed by the first guiding rib and a lateral side of the display.

In an embodiment of the invention, the electronic device further includes a securing element, the display is provided with a second guiding rib therein, and the driving shaft has a second guiding groove, wherein the securing element passes through the second guiding groove to be inserted into the second guiding rib so that the driving shaft is movably secured on the display relative to the display.

In an embodiment of the invention, the panoramic camera is rotated so that the panoramic camera is protruded from the plane of the display; after the panoramic camera is rotated to a predetermined angle, the hook and a third limiting portion are limited by each other. When the display is closed relative to the host, the pull bar is driven by the hinge to move rectilinearly relative to the display in a track formed by the first guiding rib and the lateral side of the display, so that the driving shaft is driven to move to the lateral side of the display by the interference between the first limiting portion and the second limiting portion, and thus the limitation applied by the third limiting portion on the hook is released and a restoring force of the torsion spring restores the panoramic camera back to an original position.

In summary, the panoramic camera can be received in the accommodating space of the display without being protruded from the plane of the display, and thus the appearance of the electronic device has integrity. In addition, by rotating the panoramic camera to be protruded from the plane of the display, the purpose of preventing black image can be attained.

In order to make the aforementioned features and advantages of the invention more comprehensible, embodiments accompanying figures are described in detail below.

DESCRIPTION OF EMBODIMENTS

Figure 1:
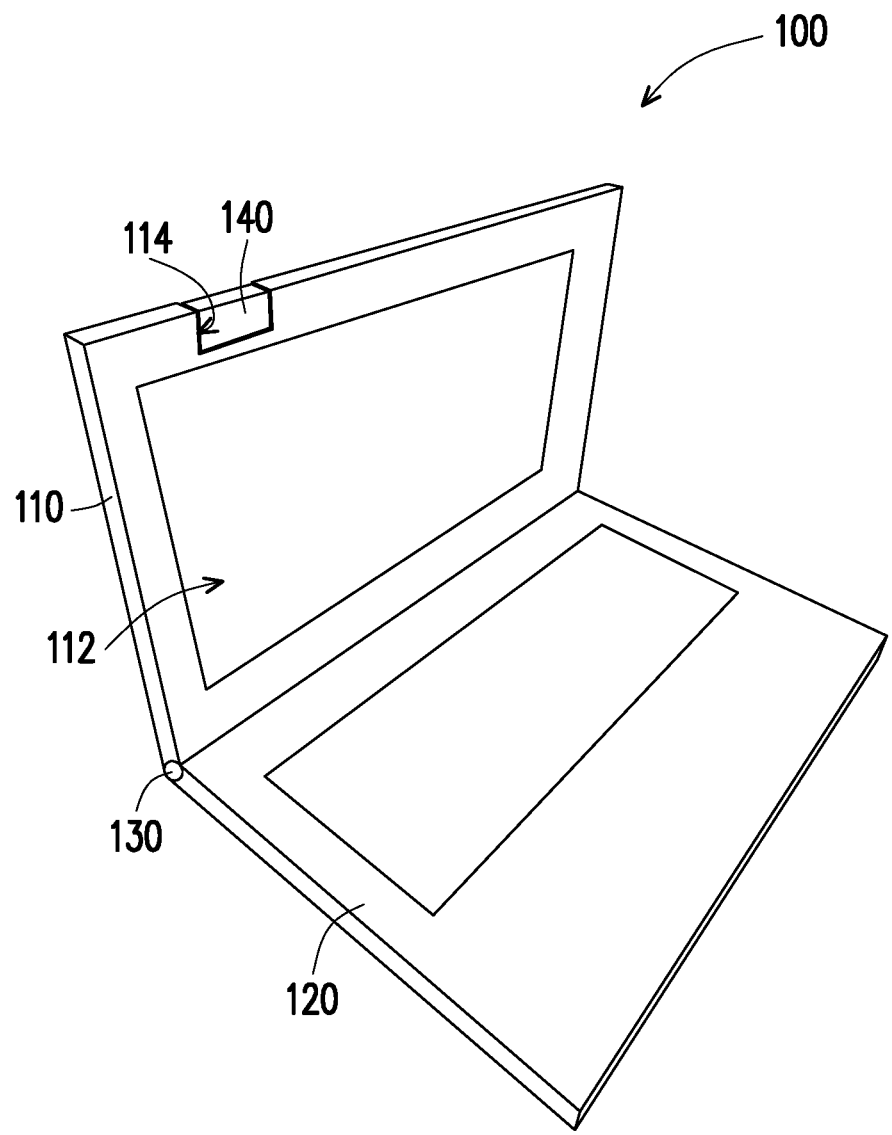
FIG. 1 is a schematic view of an electronic device of the invention, wherein a panoramic camera is received in an accommodating space.
Figure 2:
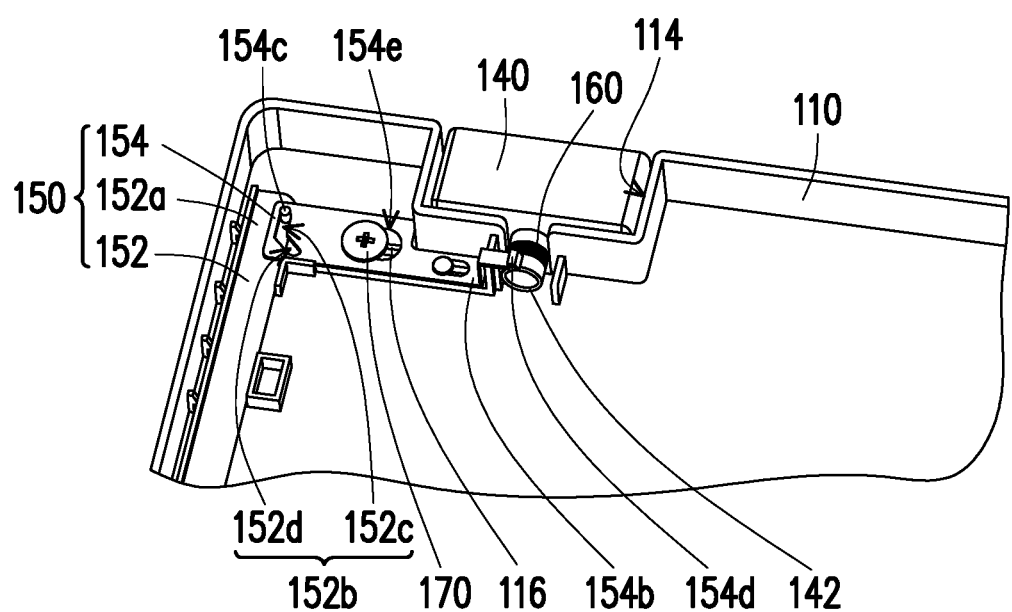
FIG. 2 is a schematic view of a partial portion of the electronic device in FIG. 1.

FIG. 1 is a schematic view of an electronic device of the invention, wherein a panoramic camera is received in an accommodating space. FIG. 2 is a schematic view of a partial portion of the electronic device in FIG. 1. Referring to FIG. 1 and FIG. 2, an electronic device 100 in the embodiment is a notebook computer which includes a display 110, a host 120, a hinge 130, a panoramic camera 140, a linkage assembly 150 and a torsion spring 160. The display 110 has a plane 112 facing the host 120, and an upper side of the display 110 is provided with an accommodating space 114. The hinge 130 is connected between the display 110 and the host 120, wherein the display 110 can be opened or closed relative to the host 120 via the hinge 130. The panoramic camera 140 is disposed in the accommodating space 114 on the upper side of the display 110. The linkage assembly 150 that limits the panoramic camera 140 is disposed in the display 110, and driven by the hinge 130 so that the panoramic camera 140 is kept in a state of being protruded from the plane 112 of the display 110. The torsion spring 160 is disposed on the lower portion of the panoramic camera 140, wherein when the display 110 is closed relative to the host 120, the hinge 130 drives the linkage assembly 150 to release the limitation on the panoramic camera 140, and the torsion spring 160 restores the panoramic camera 140 to the original position.

Specifically, the panoramic camera 140 has a lower portion 142 extending into the display 110 as a rotating axis; the lower portion 142 used as the rotating axis enables the panoramic camera 140 to be rotated relative to the display 110. The linkage assembly 150 includes a pull bar 152 and a driving shaft 154, wherein a longitudinal direction of the pull bar 152 is parallel with an axial direction of the lower portion 142 of the panoramic camera 140. The pull bar 152 has a first end 152a and a second end (not shown). The first end 152a has a first limiting portion 152b, and the second end (not shown) is connected to the hinge 130. A longitudinal direction of the driving shaft 154 is perpendicular to the axial direction of the lower portion 142 of the panoramic camera 140. The driving shaft 154 has a third end 154a and a fourth end 154b. The third end 154a has a second limiting portion 154c. The second limiting portion 154c and the first limiting portion 152b interfere with each other. The fourth end 154b has a third limiting portion 154d, and the third limiting portion 154d is adapted to limit a hook 144 provided on the lower portion 142 of the panoramic camera 140. The torsion spring 160 is disposed on the lower portion 142 of the panoramic camera 140 to restore the panoramic camera 140 to the original position through a restoring force after the limitation applied on the third limiting portion 154d and the hook 144 is released.

In continuation of the above, the first limiting portion 152b is one of a bump and a first guiding groove, and the second limiting portion 154c is the other one of the bump and the first guiding groove. In the embodiment, the first limiting portion 152b is a first guiding groove, and the second limiting portion 154c is a bump, wherein the bump is disposed in the first guiding groove, and the bump is adapted to move along the first guiding groove. The first guiding groove has a first guiding portion 152c and a second guiding portion 152d, and an obtuse angle is formed between the first guiding portion 152c and the second guiding portion 152d so that the bump can move smoothly between the first guiding portion 152c and the second guiding portion 152d.

Additionally, a first guiding rib 116 is disposed in the display 110, a track is formed by the first guiding rib 116 and a lateral side of the display 110, and the pull bar 152 can move rectilinearly relative to the display 110 in the track.

The electronic device 100 further includes a securing element 170, a second guiding rib 118 is further disposed in the display 110, and the driving shaft 154 has a second guiding groove 154e, wherein the securing element 170 passes through the second guiding groove 154e to be inserted into the second guiding rib 118 so that the driving shaft 154 can be secured on the display 110 while moving horizontally relative to the display 110.

Referring to FIG. 1 and FIG. 2, in general state, the panoramic camera 140 is received in the accommodating space 114 on the upper side of the display 110 of the electronic device 100. It can be derived that the overall thickness of the panoramic camera 140 may be the same as the thickness of the display 110, or the overall thickness of the panoramic camera 140 is smaller than the overall thickness of the display 110, and thus not only that the panoramic camera 140 in the received state is not protruded from the plane 112 of the display 110, but also the overall thickness of the electronic device 100 can maintain the original design without being affected by the configuration of the panoramic camera 140, and the appearance thereof can have coherent integrity as well.

Figure 3:
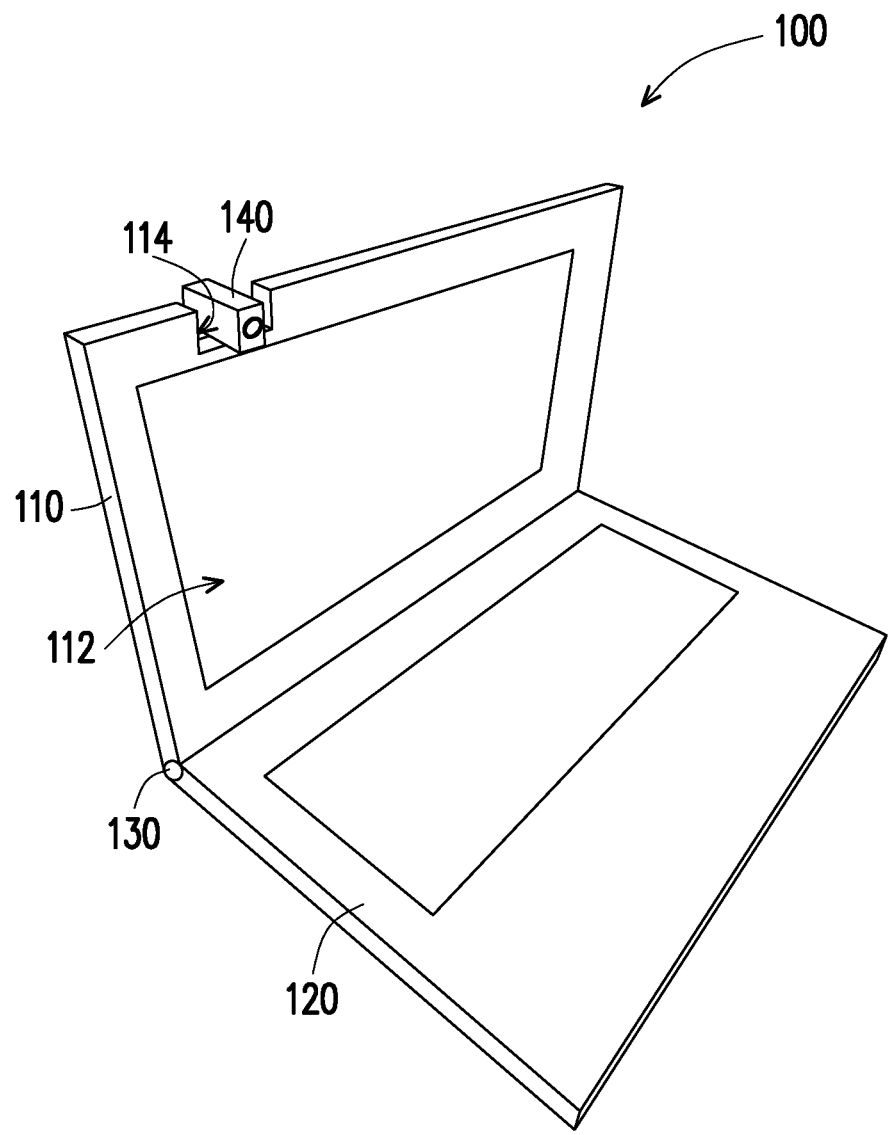
FIG. 3 is a schematic view of a panoramic camera of the electronic device in FIG. 1 protruded from a plane of a display.
Figure 4:
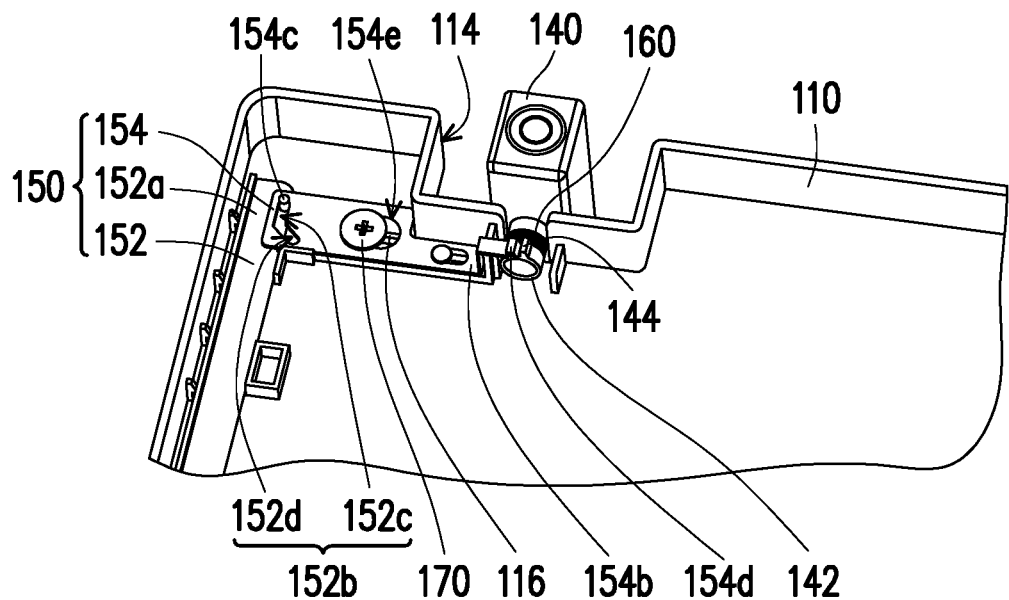
FIG. 4 is a schematic view of the panoramic camera in FIG. 3 being limited by a linkage assembly.

When the photographing or video function is to be used, the panoramic camera 140 can be rotated, for example, by moving the panoramic camera 140 with hand or by the means of program-control or mechanical control to make the panoramic camera 140 to rotate about the lower portion 142 extending into the display 110 as the rotating axis so that the panoramic camera 140 can be rotated relative to the display 110 and the lens is protruded from the plane 112 of the display 110 as shown in FIG. 3. When the panoramic camera 140 is rotated to a predetermined angle, the hook 144 disposed on the lower portion 142 of the panoramic camera 140 is rotated to a position to be interfered with the third limiting portion 154d of the fourth end 154b of the driving shaft 154, and the third limiting portion 154d limits the hook 144, as shown in FIG. 4, so that the panoramic camera 140 is maintained at a fixed angle relative to the display 110 to perform panoramic photographing or video function.

Likewise, the limitation applied by the third limiting portion 154d on the hook 144 may be released by the means of program-control or mechanical control so that the panoramic lens can be returned into the accommodating space 114.

Figure 5:
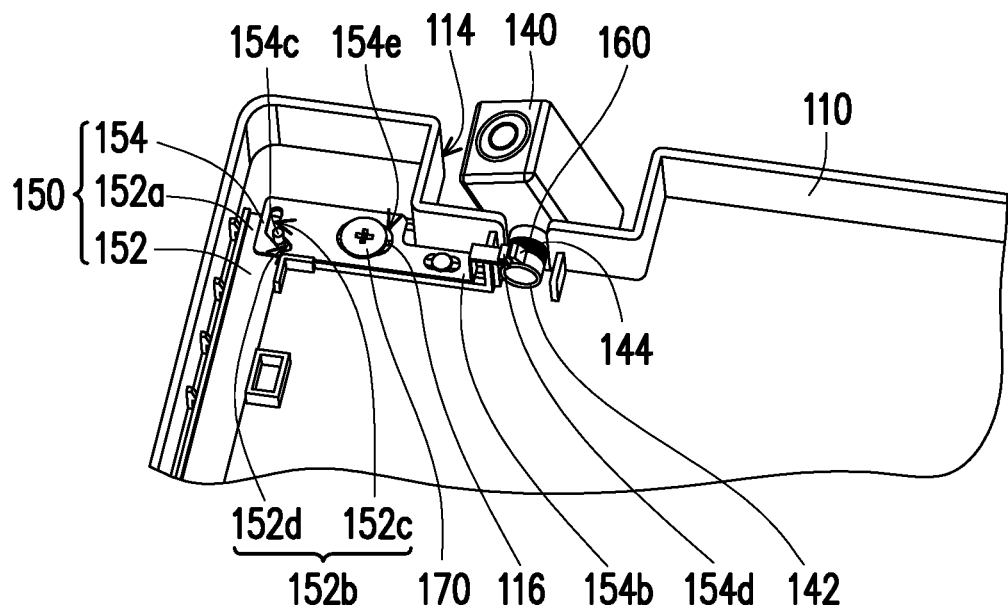
FIG. 5 is a schematic view of a linkage assembly driven by a hinge to release limitation on a panoramic camera.

In particular, under the circumstances where the panoramic camera 140 is still protruded from the plane 112 of the display 110, the user can directly press the display 110 to make the display 110 to be closed relative to the host 120 by the hinge 130. In the meantime, the pull bar 152 in the linkage assembly 150 is driven by the hinge 130 to move downward in the track formed by the first guiding rib 116 and the lateral side of the display 110, and the first limiting portion 152b as the bump in the second limiting portion 154c as the first guiding groove is moved from the first guiding groove 152c to the second guiding portion 152d, thereby driving the driving shaft 154 to move toward the lateral side of the display 110, wherein the driving shaft 154 can only move horizontally due to the cooperation between the securing element 170 and the second guiding groove 154e, and thus the limitation applied by the third limiting portion 154d on the hook 144 can be released as shown in FIG. 5. At this time, by the restoring force of the torsion spring 160, the panoramic camera 140 is restored to the original position from the state of being protruded from the plane 112 of the display 110, and the panoramic camera 140 is disposed in the accommodating space 114 without being protruded from the plane 112 of the display 110.

In view of the above, even if the user does not notice that the panoramic camera 140 is still protruded from the plane 112 of the display 110, when the user directly closes the display 110 relative to the host 120, the panoramic camera 140 can be automatically received into the accommodating space 114, and the panoramic camera 140 would not be collided with the host 120.

It should also be mentioned that, persons of ordinary skill should know that the descriptions provided in the specification regarding moving up/down, to the left/right, in a vertical/horizontal manner or moving to a particular position are incorporated in corresponding to the arrangement of the elements shown in the drawings and corresponding relationship. When the basis is changed, the descriptions regarding moving up/down, to the left/right, in a vertical/horizontal manner or moving to a particular position are also subject to change.

In summary, the electronic device of the invention enables the panoramic camera to be rotated outwards from the plane of the display of the electronic device and rotated inwards to be aligned with the plane of the display or retracted back, and thus the appearance of the electronic device does not need to have larger thickness in partial portion when conventional panoramic camera is applied to notebook computer. Accordingly, the appearance of the electronic device of the invention has coherent integrity and the overall thickness is not increased.

Furthermore, since the panoramic camera can be rotated to be protruded from the plane of the display, as compared with conventional panoramic camera that is applied to notebook computer, the black image that is likely to be generated in a combined image can be avoided.

Additionally, even if the user forgets that the panoramic camera is in the state of being protruded from the plane of the display and would like to close the display relative to the host, since the linkage assembly is driven by the hinge, the limitation applied by the third limiting portion of the driving shaft to the hook on the lower portion of the panoramic camera can be released, and the restoring force of the torsion spring enables the panoramic camera to be rotated and restored automatically into the accommodating space without being protruded from the plane of the display, and thus the possibility that the panoramic camera that is not received is collided with the host and damaged can be reduced.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic device, comprising:
   a display and a host, the display having a plane, the plane facing the host, and an upper side of the display being provided with an accommodating space;
   a hinge, connected between the display and the host, wherein the display can be opened or closed relative to the host by the hinge;
   a panoramic camera, disposed in the accommodating space on the upper side of the display, wherein the panoramic camera having a lower portion extending into the display and used as a rotating axis, and by means of the lower portion, the panoramic camera is adapted to be rotated relative to the display;
   a linkage assembly, adapted to limit the panoramic camera when the panoramic camera is rotated relative to the display to a predetermined angle, wherein when the display is closed relative to the host, the hinge drives the linkage assembly to release limitation on the panoramic camera; and
   a torsion spring, disposed on the lower portion of the panoramic camera extending into the display, and adapted to enable the panoramic camera to be restored to an original position after the linkage assembly releases the limitation on the panoramic camera.

2. The electronic device according to claim 1, wherein the linkage assembly comprises:
   a pull bar, wherein a longitudinal direction of the pull bar is parallel with an axial direction of the lower portion, the pull bar has a first end and a second end, the first end has a first limiting portion and the second end is connected with the hinge; and
   a driving shaft, wherein a longitudinal direction of the driving shaft is perpendicular to an axial direction of the lower portion used as a rotating axis, the driving shaft has a third end and a fourth end, the third end has a second limiting portion, the second limiting portion and the first limiting portion interfere with each other, and the fourth end has a third limiting portion, wherein the lower portion of the panoramic camera is provided with a hook, and the third limiting portion is adapted to limit the hook.

3. The electronic device according to claim 2, wherein the first limiting portion is one of a bump and a first guiding groove, and the second limiting portion is the other one of the bump and the first guiding groove.

4. The electronic device according to claim 3, wherein the first guiding groove has a first guiding portion and a second guiding portion, and an obtuse angle is formed between the first guiding portion and the second guiding portion.

5. The electronic device according to claim 2, wherein the display is provided with a first guiding rib therein, and the pull bar is moved rectilinearly relative to the display in a track formed by the first guiding rib and a lateral side of the display.

6. The electronic device according to claim 2, further comprising a securing element, and the display being provided with a second guiding rib therein, and the driving shaft having a second guiding groove, wherein the securing element passes through the second guiding groove to be inserted into the second guiding rib such that the driving shaft is movably secured on the display relative to the display.

7. The electronic device according to claim 6, wherein the panoramic camera is rotated such that the panoramic camera is protruded from the plane of the display, and after the panoramic camera is rotated to the predetermined angle, the hook and the third limiting portion are limited by each other.

8. The electronic device according to claim 7, wherein when the display is closed relative to the host, the pull bar is driven by the hinge to move rectilinearly relative to the display in a track formed by the first guiding rib and the lateral side of the display, thereby driving the driving shaft to move toward the lateral side of the display through interference between the first limiting portion and the second limiting portion, such that the limitation applied by the third limiting portion on the hook is released, and a restoring force of the torsion spring enables the panoramic camera to be restored to an original position.

* * * * *